United States Patent [19]

Daidoji

[11] Patent Number: 5,198,797
[45] Date of Patent: Mar. 30, 1993

[54] HEADS-UP DISPLAY ARRANGEMENT FOR VEHICLE

[75] Inventor: Shigetoshi Daidoji, Kanagawa, Japan

[73] Assignee: Nissan Motor Co., Ltd., Japan

[21] Appl. No.: 684,099

[22] Filed: Apr. 12, 1991

[30] Foreign Application Priority Data

May 11, 1990 [JP] Japan ................... 2-122351

[51] Int. Cl.$^5$ ............................. B60Q 1/00
[52] U.S. Cl. ................... 340/425.5; 340/980;
340/461; 340/705; 340/525; 353/13; 353/14
[58] Field of Search ............ 340/425.5, 461, 462,
340/705, 980, 525; 334/86; 353/13, 14;
455/154, 158, 154.1, 154.2, 158.1, 158.2, 158.3,
158.4

[56] References Cited

U.S. PATENT DOCUMENTS

| | | | |
|---|---|---|---|
| 4,264,979 | 4/1981 | Gutowski | 340/425.5 |
| 4,390,861 | 6/1983 | Cohen et al. | 340/705 |
| 4,886,328 | 12/1989 | Iino | 340/980 |
| 4,908,611 | 3/1990 | Iino | 340/980 |
| 4,983,951 | 1/1991 | Igarashi et al. | 340/461 |

FOREIGN PATENT DOCUMENTS 60-192912  1/1985  Japan .

OTHER PUBLICATIONS

Manual of AM-FM Electronic Tuning Radio, May 1989, Publication No. OM9E-0J3OUO, Nissan.

Primary Examiner—Jin F. Ng
Assistant Examiner—Dov Popovici
Attorney, Agent, or Firm—Lowe, Price, LeBlanc & Becker

[57] ABSTRACT

A heads up display arrangement for a vehicle comprises a combiner arranged on a front window panel, and a projector arranged for projecting a value of a frequency received by a radio receiver. During operation of an automatic tuning mechanism of the radio receiver, the value of received frequency is not outputted to the projector.

4 Claims, 4 Drawing Sheets

HEADS-UP DISPLAY ARRANGEMENT FOR VEHICLE

BACKGROUND OF THE INVENTION

The present invention relates to a heads-up display for a vehicle, which indicates a frequency received by a radio receiver.

In general, a radio receiver for use in an automotive vehicle includes an automatic tuning mechanism which allows automatic switching of a received frequency from one frequency value to another in accordance with selection made by a driver or passenger, resulting pincipally in an increase in operability of the tuner during vehicle run. In view of operation made by the driver or passenger, the radio receiver is often arranged in the vicinity of the center of the vehicle as viewed in a cross direction thereof and below an instrument panel. In that event, a received frequency is digitally displayed on the front of the radio receiver.

On the other hand, there is known a heads-up display arrangement which includes a combiner disposed in a front window panel of the vehicle, and a projector disposed within the instrument panel for projecting different data such as a vehicle speed, an actual amount of fuel, etc. to the combiner. Accordingly, if the heads-up display arrangement is applied to display the received frequency of the radio receiver, the driver will have a minimum motion of his eyes because the combiner is in the driver's sight. For structure of the projector of the heads-up display arrangement, see JP-A 60-192912.

With the radio receiver having a digital display on the front thereof, when checking the received frequency, the driver is required to move his eyes from a position ahead of the vehicle to same in the vicinity of the center of the vehicle as viewed in the cross direction thereof and below the instrument panel, raising a problem of security during vehicle run.

On the other hand, with the heads-up display arrangement, the driver will have a minimum motion of his eyes as described above. However, in case of the radio receiver having an ordinary automatic tuning mechanism, the digital display is changed to show one frequency after another during switching of a frequency from one to another in accordance with selection made by the driver or passenger, and such quick and successive change in display may affect the driver's eyes.

By way of example, if the driver or passenger selects a FM radio station of 80.0 MHz when receiving a frequency of 75.2 MHz, the digital display of the received frequency is successively changed approximately every 0.2 second from 75.2 to 80.0 in such a manner as 75.2, 75.3, ..., 79.9, 80.0. The driver perceives this change in display as a flicker, resulting in a decrease in visibility ahead of the vehicle.

SUMMARY OF THE INVENTION

It is, therefore, an object of the present invention to provide a heads-up display arrangement for a vehicle which is free of a decrease in visibility ahead of the vehicle due to quick and successive change in display.

According to one aspect of the present invention, there is provided a heads-up display arrangement for a vehicle having a front window panel, and a radio receiver with an automatic tuning mechanism, comprising:

a combiner arranged on the front window panel;

a projector optically connected to said combiner, said projector projecting a value of frequency received by the radio receiver; and means for canceling an output of said value of frequency to said projector while the automatic tuning mechanism is in operation.

According to another aspect of the present invention, there is provided a method of controlling a heads-up display arrangement for a vehicle having a radio receiver with an automatic tuning mechanism, the method comprising the steps of:

providing an output of a value of frequency received by the radio receiver while the automatic tuning mechanism fails to be in operation; and canceling said output of said value of frequency while the automatic tuning mechanism is in operation.

According to still another aspect of the present invention, there is provided, in an automotive vehicle having a front window panel, and an instrument panel:

a radio receiver with an automatic tuning mechanism arranged within the instrument panel;

a combiner arranged on the front window panel;

a projector optically connected to said combiner, said projector projecting a value of frequency received by the radio receiver; and a microcomputer so constructed and arranged as to control said projector, said microcomputer including:

means for providing an output of said value of frequency received by the radio receiver while the automatic tuning mechanism fails to be in operation; and means for canceling said output of said value of frequency while the automatic tuning mechanism is in operation.

DETAILED DESCRIPTION OF THE INVENTION

Figure 1:
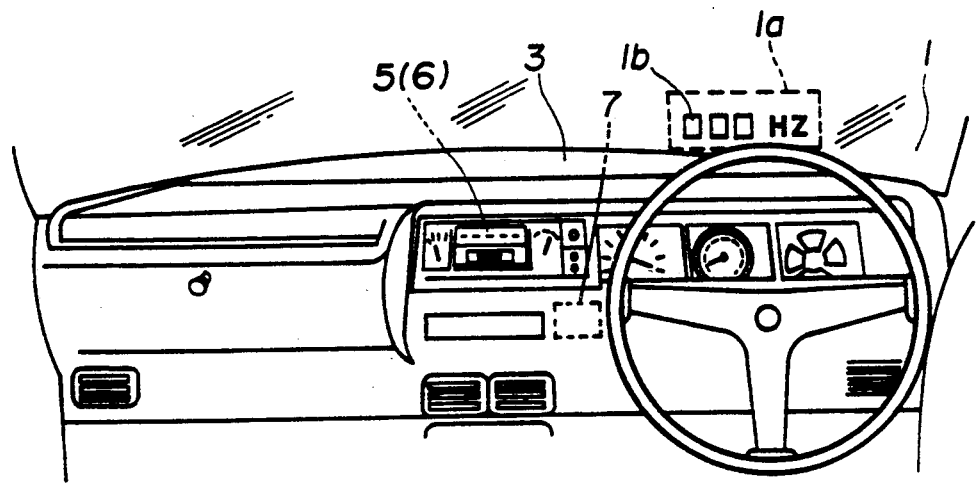
FIG. 1 is a schematic view showing the front of a cabin of an automotive vehicle with a combiner of a heads-up display for a vehicle.

Referring to FIG. 1, an automotive vehicle is provided with a front window panel 1, and an instrument panel 3. A combiner 1a is arranged in a predetermined position of the front window panel 1 in a normal driver's sight. The combiner 1a is obtained by uniformly coating a previously selected metallic oxide on a surface of the front window panel 1, and has a light transmittance smaller than that of the front window panel 1 for a light having a predetermined wavelength. Formed on the combiner 1a is an image 1b of a frequency received by a radio receiver 5 having an automatic tuning mechanism 6. This automatic tuning mechanism 6 is of the ordinary type as described, for example, in the Manual of AM-FM Electronic Tuning Radio which is herein incorporated.

Figure 2:
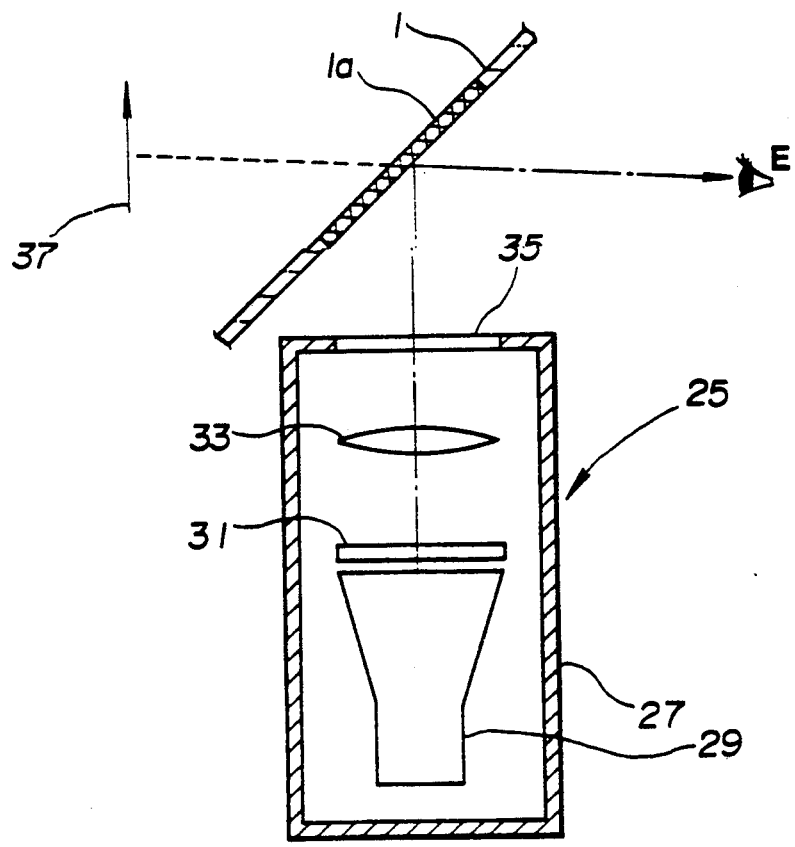
FIG. 2 is a longitudinal section showing a preferred embodiment of a heads-up display arrangement for a vehicle according to the present invention.

Referring also to FIG. 2, a projector 25 is arranged within the instrument panel 3. The projector 25 includes a casing 27, a display source 29, a filter 31, a convex lens 33, and a transparent cover 35. The display source 29 is arranged within the casing 27, and outputs a light energy representing driving information and received frequency. Output of the display source 29 is projected on the combiner 1a of the front window panel 1 via the filter 31, the convex lens 33, and the transparent cover 35, thus obtaining the image 1b. From a position of driver's eyes E, this image 1b is perceived as an image 37 formed outside and ahead of the front window panel 1. In that manner, not only different driving data such as a vehicle speed, an actual amount of fuel, etc., but a frequency received by the radio receiver 5 can also be projected and displayed on the combiner 1a.

Figure 3:
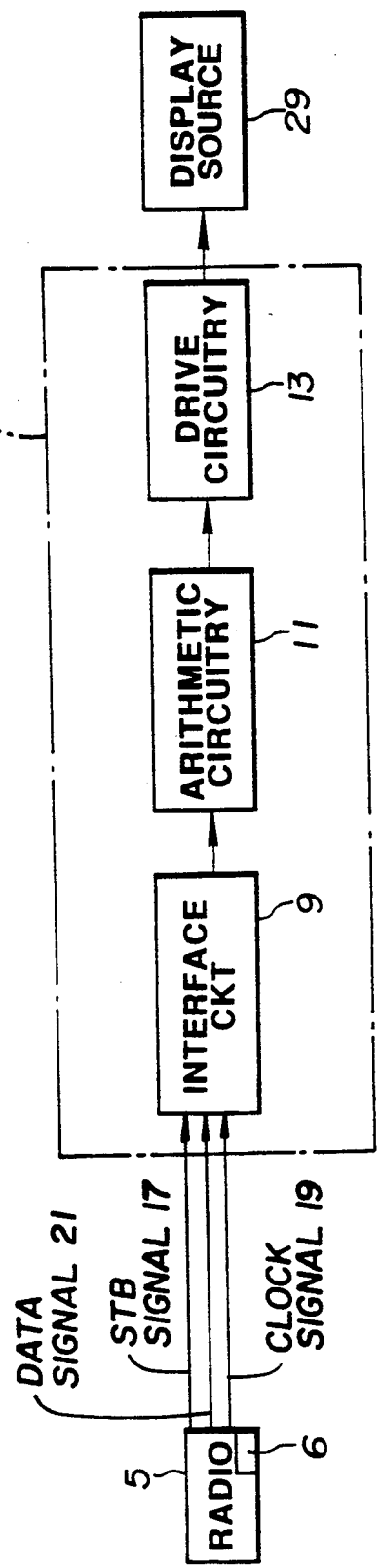
FIG. 3 is a block diagram showing flow of processing of received frequency signal.

Referring to FIG. 3, a block diagram shows flow of processing of received frequency.

An microcomputer 7 includes interface circuitry 9, arithmetic circuitry 11, and drive circuitry 13. The interface circuitry 9 inputs a data signal 21 (which will be described hereinafter) indicative of received frequency from the radio receiver 5. In the interface circuitry 9, the data signal 21 is shaped in waveform, and outputted to the arithmetic circuitry 11.

The arithmetic circuitry 11 calculates, based on the waveform of the data signal, 21 is calculated to obtain a value of received frequency to be displayed on the combiner 1a, outputs the obtained value to drive circuitry 13 in digital form. As will be detailed hereinafter in connection with FIG. 4, the arithmetic circuitry 11 functions to check received frequency to be read every predetermined period of time, and to output only the received frequency available to display, and to cut out frequencies not available to display, i.e., to cut out the data signal 21 during operation of an automatic tuning mechanism 6 of the radio receiver 5.

Based on the signal derived from the arithmetic circuitry 11, the drive circuitry 13 outputs to the display source 29 the value of received frequency to be displayed. Thus, the display source 29 projects its output on the combiner 1a of the front window panel 1 through the projector 25 as shown in FIG. 2.

It is to be noted that the interface circuitry 9 inputs, in addition to the data signal 21 indicative of received frequency signal from the radio receiver 5 as shown in FIG. 3, different data signals indicative of vehicle running condition such as a vehicle speed, an actual amount of fuel, and an engine speed.

Figure 4:
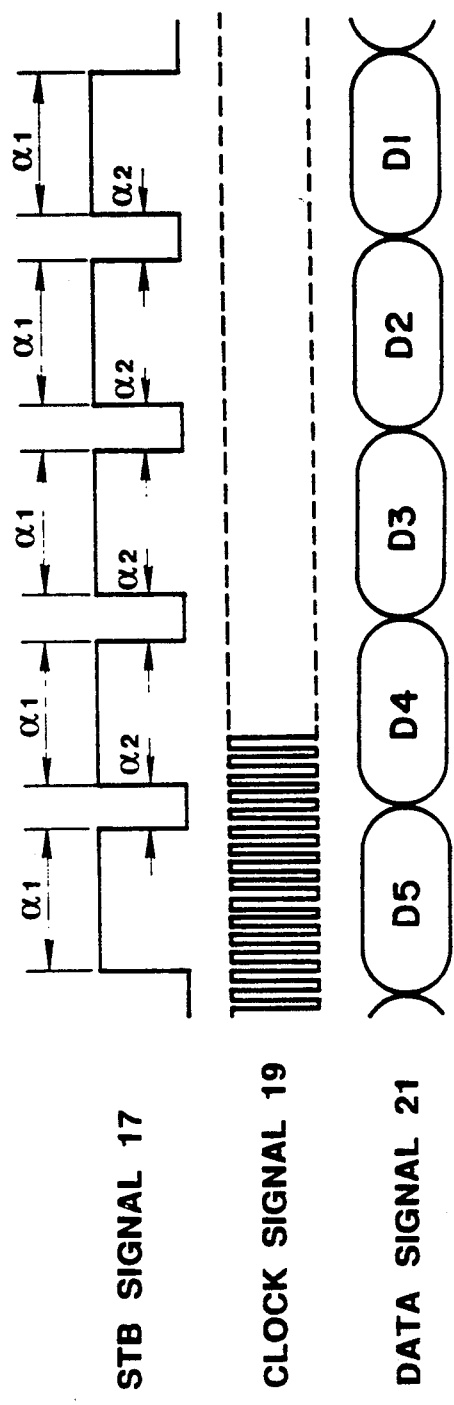
FIG. 4 is a waveform chart showing signals for controlling a received frequency.

Referring to FIG. 4, a detailed description will be made with regard to control of a received frequency. Three signals are used for that purpose: a strobe (STB) signal 17, a clock signal 19, and the data signal 21.

The STB signal 17 is a sampling signal in the form of pulses, and used for checking a received frequency selected every predetermined period of time. That is, the pulses of the STB signal 17 function to define a time range in which the data signal 21 is available. In FIG. 4, an available time range is defined by $\alpha_1$ (alpha 1), and a nonavailable time range is defined by $\alpha_2$ (alpha 2).

The clock signal 19 is a pulse sequence, and is used for signal synchronization between the radio receiver 5 and the by microcomputer.

The data signal 21 includes input data indicating a received frequency of the radio receiver 5 as expressed, for example, in binary number. Thus, it will be understood that the data signal 21 quickly changes during operation of the automatic tuning mechanism 6 of the radio receiver 5.

In synchronism with the clock signal 19, the arithmetic circuitry 11 inputs the data signal 21 in binary number by which received frequency of the radio receiver 5 is read. And, based on pulses of the STB signal 17, the arithmetic circuitry 11 checks data signal 21 each predetermined period of time defined by the range $\alpha_1$ (alpha 1), and outputs to the drive circuitry 13 received frequency available to display.

In this embodiment, the time range $\alpha_2$ (alpha 2) in which the input data signal 21 is not available coincides with a time required for operation of the automatic tuning mechanism 6 of the radio receiver 5. That is, during operation of the automatic tuning mechanism 6, the data signal 21 is cut out by the STB signal 17.

Thus, the drive circuitry 13 inputs from the arithmetic circuitry 11 only received frequency information. In turn, the drive circuitry 13 outputs to the display source 29 the value of the received frequency, which projects the same on the combiner 1a of the front window panel 1.

Figure 5:
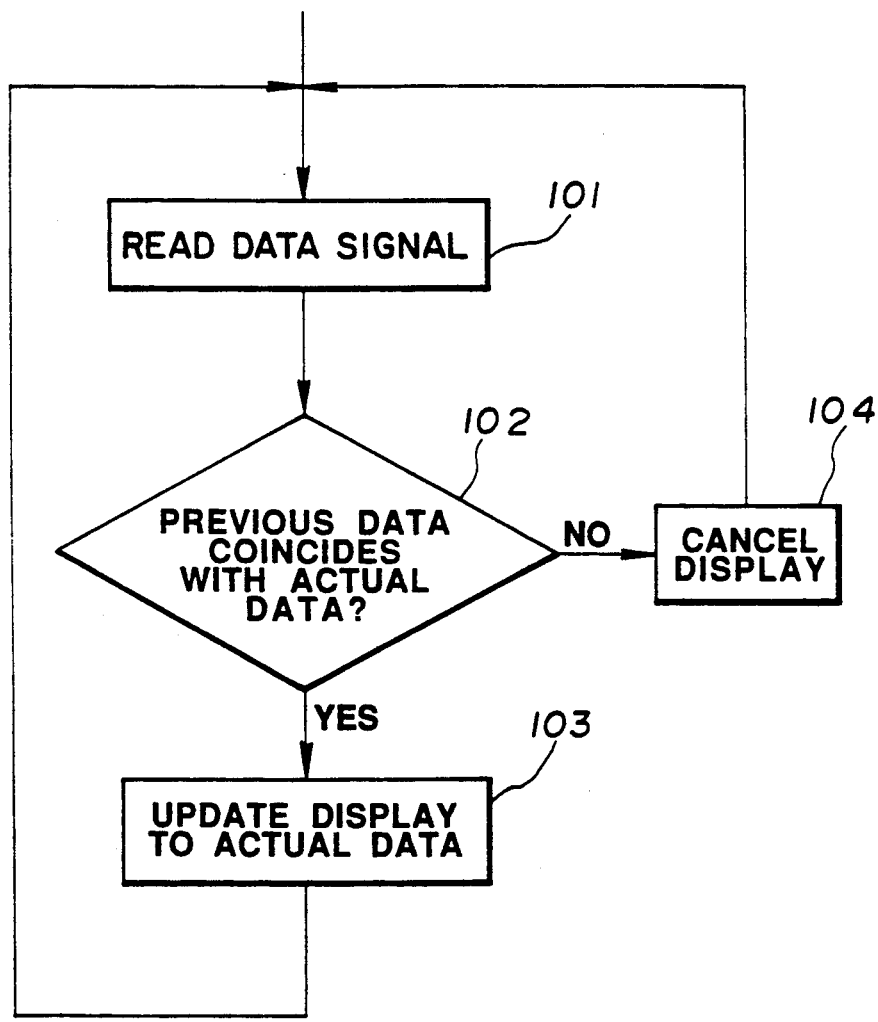
FIG. 5 is a flowchart showing a control of this preferred embodiment.

Referring to FIG. 5, a flowchart shows an example of control in the arithmetic circuitry 11. The microcomputer 7, which includes the arithmetic circuitry 11, repeatedly executes the illustrated control sequence each predetermined period of time, for example, of the order of 2 $\mu$s.

At a step 101, the data signal 21 is read during the time range $\alpha_1$ (alpha 1) of the STB signal 17. It is to be noted that a next value of the data signal 21 is read during the next time range $\alpha_1$ (alpha 1) of the STB signal 17.

At a subsequent step 102, it is checked whether or not a value of the data signal 21 as previously read (previous data) coincides with an actual data thereof. If the answer to the inquiry at the step 102 is YES, the previous data coincides with the actual one, the control proceeds to a step 103, whereas if the answer is NO, by i.e., the previous data fails to coincide with the actual data the control proceeds to a step 104.

The coincidence of the two data at the step 102 means that the automatic tuning mechanism 6 is not in operation, or has come to an end. Thus, at the step 103, a value of the received frequency is updated, and the updated value is outputted to the drive circuitry 13. Then, control returns to the step 101.

On the other hand, the lack of coincidence of the two data at the step 102 means that the automatic tuning mechanism 6 is in operation. Accordingly, at the step 104, display of the received frequency is canceled, for example, by canceling provision of the frequency value to the projector 25, and control returns to the step 101 to repeatedly execute similar processing.

In brief, when the automatic tuning mechanism 6 is not in operation, or comes to an end, a value of the received frequency is displayed on the combiner 1a of the front window panel 1, whereas when the automatic tuning mechanism 6 is in operation, display of the received frequency is canceled on the combiner 1a. As a result, the combiner 1a fails to have a quick and successive change in digital display, a flicker.

What is claimed is:

1. A heads-up display arrangement for a vehicle having a front window panel, and a radio receiver with an automatic tuning mechanism, comprising:
 a combiner arranged on the front window panel;
 a projector optically connected to said combiner, said projector projecting on said combiner a value provided thereto representing a frequency received by the radio receiver; and means for canceling provision of said value of frequency to said projector while the automatic tuning mechanism is in operation.

2. A heads-up display arrangement as claimed in claim 1, wherein said combiner includes a metallic oxide coating having a light transmittance smaller than that of the front window panel for a light having a predetermined wavelength.

3. A method of controlling a heads-up display arrangement for a vehicle having a radio receiver with an automatic tuning mechanism, the heads-up display including a projector, the method comprising the steps of:

providing to the projector for display a value of frequency received by the radio receiver while the automatic tuning mechanism is not in operation, and canceling display of a value of frequency while the automatic tuning mechanism is in operation.

4. In an automotive vehicle having a front window panel, and an instrument panel:

a radio receiver with an automatic tuning mechanism arranged within the instrument panel;

a combiner arranged on the front window panel;

a projector optically connected to said combiner, said projector projecting a value of frequency received by said radio receiver, and a microcomputer connected to said radio receiver and said projector, said microcomputer executing a control sequence controlling said projector, said microcomputer including:

means for providing to said projector said value of frequency received by said radio receiver while said automatic tuning mechanism is not in operation; and means for canceling provision to said projector of said value of frequency while the automatic tuning mechanism is in operation.

* * * * *